United States Patent

Miller et al.

[11] Patent Number: 5,295,205
[45] Date of Patent: Mar. 15, 1994

[54] ENVIRONMENTALLY STABLE MONOLITHIC MACH-ZEHNDER DEVICE

[75] Inventors: William J. Miller, Daniel A. Nolan, both of Corning, N.Y.

[73] Assignee: Corning Incorporated, Corning, N.Y.

[21] Appl. No.: 38,244

[22] Filed: Mar. 29, 1993

[51] Int. Cl.⁵ .............................................. G02B 6/26
[52] U.S. Cl. ........................................ 385/1; 385/43; 65/4.2
[58] Field of Search ................... 385/1, 41, 42, 43, 44, 385/45, 51, 12; 65/4.2; 356/345

[56] References Cited

U.S. PATENT DOCUMENTS

| | | | |
|---|---|---|---|
| 4,915,467 | 4/1990 | Berkey | 385/43 |
| 5,011,251 | 4/1991 | Miller et al. | 385/43 |
| 5,044,716 | 9/1991 | Berkey | 385/51 |
| 5,119,453 | 6/1992 | Gonthier et al. | 350/96 |
| 5,177,803 | 1/1993 | Newhouse et al. | 385/43 |
| 5,240,489 | 8/1993 | Robson | 65/4.2 |

FOREIGN PATENT DOCUMENTS 0213778 3/1987 European Pat. Off.

OTHER PUBLICATIONS

B. Malo et al. "Unbalanced Dissimilar-Fibre Mach-Zehnder Interferometer: Application as Filter", Electronics Letters, Oct. 12, 1989, vol. 25, No. 21, pp. 1416–1417.

*Primary Examiner*—Rodney B. Bovernick
*Assistant Examiner*—Phan Thi Heartney
*Attorney, Agent, or Firm*—W. J. Simmons, Jr.

[57] ABSTRACT

A monolithic, environmentally stable Mach-Zehnder device is formed by threading first and second dissimilar optical fibers through the bore of a glass tube. The tube is evacuated and heated to collapse it onto the fibers. The tube is further heated and stretched at two spaced locations to form two couplers that are joined by the two optical fibers. The fibers have different propagation constants in the region between the two couplers, whereby there is a relative delay in the optical signal propagating in one of the fibers with respect to the optical signal propagating in the other fiber.

19 Claims, 3 Drawing Sheets

ENVIRONMENTALLY STABLE MONOLITHIC MACH-ZEHNDER DEVICE

BACKGROUND OF THE INVENTION

The present invention relates to environmentally stable Mach-Zehnder devices and to methods of making such devices.

There is an emerging need for narrowband wavelength division multiplex (WDM) couplers and filters. Such devices are needed in the 1550 nm window for modifying the gain spectrum of erbium fiber amplifiers. They will also be widely used in trunk lines as well as in fiber-to-the-subscriber architectures.

There is a need for both wavelength tunable components and fixed wavelength components. In an all optical network, for example, the device can be tuned at the receiver end in order to detect the desired incoming signal. In a second approach, tunable lasers are used to send a plurality of signals, and the desired signal is detected by employing a receiver having a fixed filter. The transmission system could also employ both fixed lasers and filters. The wavelength separation capabilities of such filters needs to be on the order of tens of nanometers to as small as a nanometer. Moreover, these components will need to be environmentally stable and very reliable.

The Mach-Zehnder filter is known for its narrowband wavelength capabilities. It has been proposed that filters having pass bands as narrow as 1 nm be formed by connecting two evanescent couplers with unequal fiber lengths between them. See OFC Conference on Optical Fiber Communication, Minitutorial Sessions, Jan. 22-26, 1990, page 256 (part of a presentation on "Dense WDM Techniques" by C. A. Brackett). It is difficult to achieve reproducibility and environmental stability with this approach, since the connecting fibers are subject to external destabilizing conditions such as temperature changes and random bending forces.

SUMMARY OF THE INVENTION

It is therefore an object of the present invention to provide an environmentally stable Mach-Zehnder device. Another object is to provide a Mach-Zehnder device that is insensitive to temperature gradients and that is able to withstand forces that would tend to cause inadvertent bending. A further object is to provide a method of forming an improved Mach-Zehnder device.

Briefly, the present invention relates to a Mach-Zehnder device comprising an elongated body of matrix glass through which first and second dissimilar optical fibers extend. The body includes a phase shift region in which the fibers have different propagation constants, whereby optical signals propagate through the optical fibers at different velocities in the phase shift region. The body further includes two spaced coupler regions at opposite ends of the phase shift region. The diameter of the body and the diameters of the fibers are smaller in the coupler regions than in the phase shift region.

The invention further relates to a method of making a monolithic Mach-Zehnder device. A plurality of optical fibers are inserted into the bore of a glass tube which is then evacuated. The tube is heated to collapse a first region thereof onto the fibers. The midregion of the first collapsed region is stretched to form a first coupling region. The tube is heated at a second region to collapse the second tube region onto the fibers. The midregion of the second collapsed region is stretched to form a second coupling region is spaced from the first coupling region.

There are two different techniques for collapsing and stretching the tube. The first and second regions and the entire portion of the tube between the two regions can be collapsed prior to stretching the first and second regions. For example, the first tube region can be heated to collapse the tube onto the fibers, and the heat source can be moved with respect to the tube until it reaches the second tube region. The first and second regions of the tube can then be sequentially stretched. In this embodiment, the fibers are embedded in the matrix glass of the tube in that portion of the tube between the two collapsed regions.

Alternatively, the first tube region can be collapsed and stretched prior to the collapse and stretch of the second tube region. In this embodiment, the tube forms a cavity between the two regions. The fibers extend through the cavity and have minimal contact with the matrix glass in the region between the two coupling regions.

DESCRIPTION OF THE PREFERRED EMBODIMENTS

Figure 1:
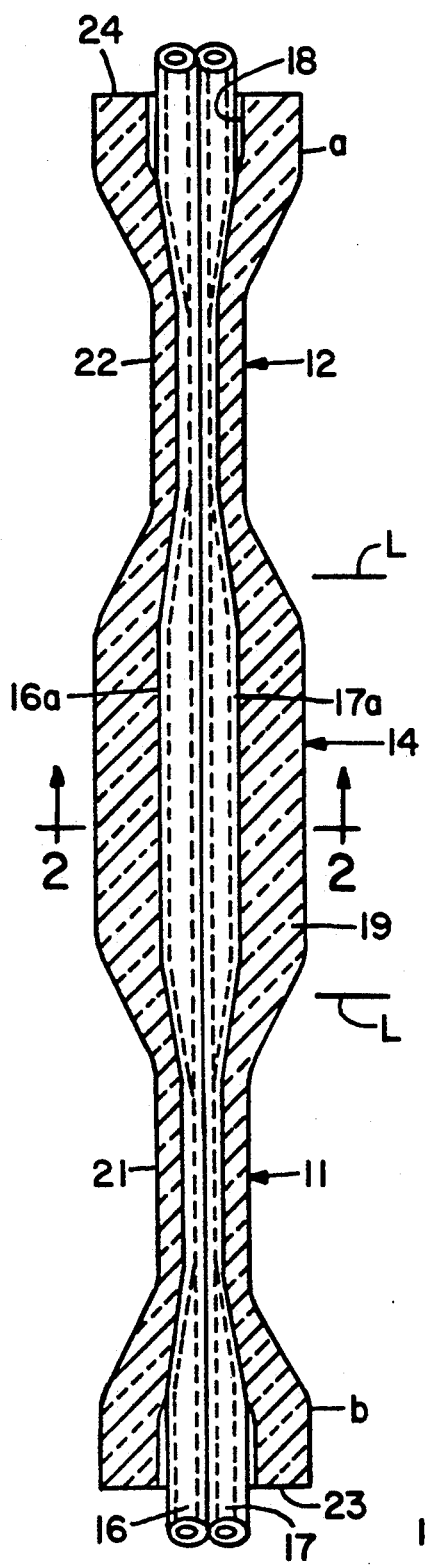
FIG. 1 is a cross-sectional view of a monolithic overclad Mach-Zehnder device.
Figure 2:
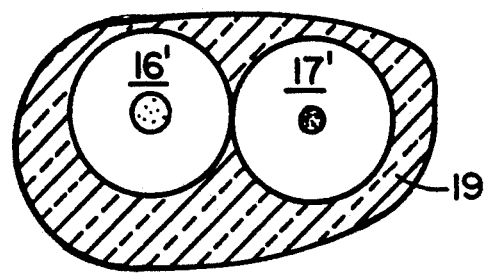
FIG. 2 is a partial cross-sectional view taken along lines 2—2 of FIG. 1.

The drawings are not intended to indicate scale or relative proportions of the elements shown therein.

In accordance with the present invention, a Mach-Zehnder device (FIG. 1) is formed as a monolithic structure that contains concatenated overclad couplers 11 and 12 that are joined by a phase shifting region 14. The device is formed by inserting optical fibers 16 and 17 into the bore 18 of a tube of matrix glass 19. Each of the optical fibers has a core surrounded by cladding of refractive index lower than that of the core. The fiber cores may have different refractive indices, $n_1$ and $n_1'$, and the fiber claddings may have different refractive indices, $n_2$ and $n_2'$. The different density of dots in the cores of fibers 16 and 17 illustrates a difference in refractive index. The refractive index $n_3$ of that portion of the matrix glass tube adjacent the fibers is less than the lowest refractive index $n_2'$ of either of the fiber claddings. The bore can be provided with funnels (not shown) at each end to facilitate insertion of the fibers. The combination of tube and fibers is referred to as a coupler preform.

Figure 3:
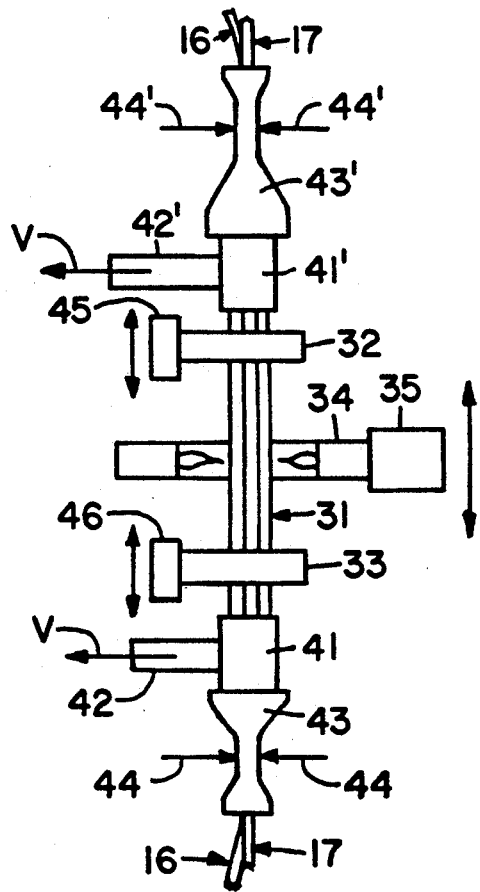
FIG. 3 is a schematic illustration of an apparatus for collapsing a capillary tube onto fibers and stretching the tube to form a coupling region.

The coupler preform can be further processed in the draw apparatus of FIG. 3. Preform 31 is inserted through ring burner 34 and is clamped to draw chucks 32 and 33 which are mounted on motor controlled stages 45 and 46. The fibers are threaded through the vacuum attachments 41 and 41' which are then sealed to the ends of preform 31. Typical vacuum attachments are disclosed in U.S. Pat. No. 5,011,251 which is incorporated herein by reference. Vacuum is supplied to tube 41 through line 42. One end of a length of thin rubber tubing 43 is attached to that end of vacuum attachment 41 opposite preform 31; the remaining end of the tubing extending within tube clamping means (not shown). Upper vacuum attachment 41' is similarly associated with line 42', tubing 43'and tube clamping means. Coated portions of the fibers extend from tubing 43 and 43', the fiber portions within the tube between points a and b being uncoated. When air pressure is directed against tubing 43 and 43'as indicated by arrows 44, 44', to clamp the tubing against the fibers extending therethrough, bore 14 is evacuated through lines 42 and 42'.

In one embodiment, that portion of the tube between points a and b is initially collapsed onto the fibers. After the preform is affixed to chucks 32 and 33 and the tube bore is evacuated, the tube is heated near a first end 23 to cause it to collapse at the region of applied heat. Chucks 32 and 33 move the preform relative to the burner to gradually extend the collapsed region toward end 24 until the desired length of collapsed tube is obtained.

In an alternative process, chucks 32 and 33 can be fixed, and burner 34 can be mounted on a motor controlled stage 35. Burner 34 is initially positioned near end 23 to cause it to collapse; stage 35 moves the burner relative to the preform to extend the collapsed region toward end 24.

Thereafter, coupler 11 is formed near end 23 of the tube by heating a region of the tube and moving computer controlled stages 45 and 46 in opposite directions to stretch the heated region. The tube stretching operation can be performed in accordance with U.S. Pat. No. 5,011,251. The rate at which the two tube ends move away from each other constitutes the combined stretch rate. The tube can be stretched at a constant rate, or the stretch rate can vary continuously or in discrete steps. The stretching operation can stop after a predetermined coupling is achieved; thereafter, the tube can be reheated, and stretching can occur at a second stretch rate. Region 21 is illustrated as having a constant diameter even though a slight taper exists therein, whereby the longitudinal center of region 21 exhibits the minimum diameter. It is well known that the coupling characteristics of the resultant coupler are determined by such parameters as the optical and mechanical characteristics of matrix glass 19 and fibers 16 and 17 and of the coupler parameters such as the length and shape of the neckdown and tapered regions.

While stretching the tube to form the first coupler, optical power can be coupled to an input optical fiber, and the output signals can be monitored to control process steps in the coupler manufacturing process. In the specific example described below, output power was not monitored for control purposes during stretching. In previous experience with overclad fiber optic couplers, the total stretching distance for both stages during the formation of each coupler was usually between 12 and 16 mm. Couplers of the type to be employed in said specific example were therefore initially elongated by some distance within that range. The optical characteristics of the resultant device were measured, and the stretching or elongation distance of subsequently made couplers were adjusted in such a manner as to more nearly achieve the desired characteristics. By this process, the optimal stretching distance was achieved. When making a Mach-Zehnder device of said specific example, the first coupler was stretched that optimal distance in order to achieve the desired optical characteristics. A signal was applied to an input fiber, and the output was monitored to verify that the desired coupling ratio had been achieved.

For best performance as a filter or a WDM coupler, couplers 11 and 12 have substantially identical coupling characteristics. The second coupler 12 is therefore preferably formed near tube end 24 by subjecting the appropriate region of the tube to stretching conditions that are identical to those used to form the first coupler.

Although couplers 11 and 12 can be achromatic or WDM type, the Mach-Zehnder device will be useful over a wider wavelength range if achromatic couplers are used. Various techniques can be used to obtain achromaticity.

In accordance with U.S. Pat. No. 5,011,251, achromaticity is achieved by making the refractive index $n_2$ of the cladding of the first coupler fiber different from the refractive index $n_2'$ of the cladding of the second coupler fiber by such an amount that the value of $\Delta_{CLADS}$ is greater than zero but less than 0.03%, wherein $\Delta_{CLADS}$ equals $(n_2^2 - n_2'^2)2n_2^2$. The difference between the refractive indices $n_2$ and $n_2'$ is such that the coupler exhibits very little change in coupling ratio with wavelength over a band of wavelengths.

In accordance with U.S. Pat. application Ser. No. 913,390 now U.S. Pat. No. 5,268,979 "Achromatic Overclad Fiber Optic Coupler" filed Jul. 15, 1992, a coupler can be made to be achromatic if the refractive index $n_3$ of the matrix glass body surrounding the coupling region is lower than $n_2$ by such an amount that the value of $\Delta_{2-3}$ is less than 0.125%, wherein $\Delta_{2-3}$ equals $(n_2^2 - n_3^2)/2n_2^2$. If the fiber claddings have different refractive indices, the lowest cladding refractive index is used to determine the value of $\Delta_{2-3}$.

Only one of the fibers of a Mach-Zehnder filter needs to extend from the device. After the device is formed, those portions of fiber 17 that extend from the device may be severed. The severed ends of fiber 17 are then preferably provided with antireflection terminations.

Figure 4:
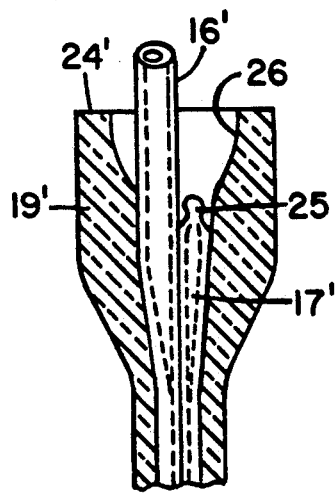
FIG. 4 is a partial cross-sectional view of an embodiment employing a fiber having an antireflection termination.

FIG. 4 shows an alternative embodiment in which elements similar to those of FIG. 1 are represented by primed reference numerals. Fiber 17' can be cut to a length slightly longer than the length of the capillary tube, and it can be entirely stripped of coating material. Antireflection terminations can be formed on each end of fiber 17' by directing a flame near the end of the fiber and pulling and severing the fiber at the heated region. The tip of the heated region is heated by a burner flame to cause the glass to recede and form a rounded endface 25, the diameter of which was equal to or slightly smaller than the original uncoated fiber diameter. After antireflection terminations are formed at both ends of the fiber, its length is slightly shorter than the capillary tube. Fiber 17' is inserted through funnel 25 and into the bore of the matrix glass capillary tube along with the bare portion of fiber 16'. The device is thereafter formed as described above. One end of fiber 16, functions as the input port, and the other end thereof functions as the output port of the resultant device.

Figure 5:
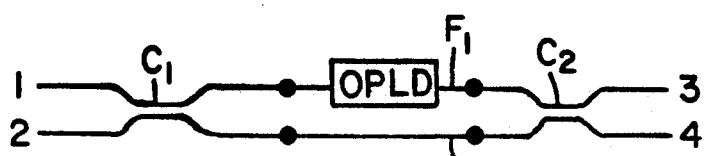
FIG. 5 is a schematic diagram of a Mach-Zehnder device.

FIG. 5 shows a schematic diagram of a conventional Mach-Zehnder device. Two couplers $C_1$ and $C_2$ are concatenated by optical fibers $F_1$ and $F_2$. The couplers, which are evanescent type couplers, are usually 3 dB couplers, whereby the optical power that is applied to input port 2, for example, is evenly divided between the two outputs of coupler $C_1$. One of the fibers has means OPLD to impart to it an optical path length difference so that there is a phase shift between the two inputs of coupler $C_2$. The phase shift has conventionally been provided, for example, by employing fibers $F_1$ and $F_2$ of different lengths or by inserting phase shifting means into one of the fibers. Such Mach-Zehnder devices have been employed to provide filtering and switching functions. However, such devices have been very sensitive to temperature differential between fibers $F_1$ and $F_2$ as well as the bending of one of those fibers relative to the other.

In accordance with this invention, the fiber portions 16' and 17' that connect couplers 11 and 12 are disposed within matrix glass 19 to protect them from adverse environmental conditions. For example, if phase shift region 14 is subjected to a temperature gradient, both fibers experience essentially the same temperature due to the effect of the matrix glass. The matrix glass also resists bending, whereby one fiber does not inadvertently become elongated with respect to the other.

Since the lengths of fiber portions 16' and 17' that extend through phase shift region 14 are equal, those fiber portions must have different propagation constants within region 14 to provide the necessary phase shift between the two signals applied from coupler 11 to coupler 12. This is accomplished by using dissimilar optical fibers. For example, the core diameter and/or refractive index profile of fiber 16 can be different from that of fiber 17. Even though the propagation constants of fibers 16 and 17 are different in region 14, they are substantially identical in the neckdown regions of couplers 11 and 12 since the fiber core diameters are very small in the stretched coupling region. The difference between the core diameters and/or refractive index profiles of coupler fibers 16 and 17 result in a difference between the propagation constants ($\Delta\beta$) of the fundamental modes propagating in those fibers outside the coupling regions of couplers 11 and 12. The effect of dissimilar cores on the propagation constants of the fundamental modes propagating in those fibers inside the coupling region ($\Delta\beta_{CR}$) is insignificant, due to the small size of the cores in that region. When the fiber cladding diameter becomes sufficiently small, the composite of the core and cladding functions as the light guiding portion of the waveguide in the coupling region, and the surrounding low index matrix material functions as the cladding. Power therefore transfers between the adjacent fiber claddings in the coupling region.

The expected wavelength separation of the device of FIG. 5 is calculated below. For a typical Mach-Zehnder device in which the propagation constants of fibers $F_1$ and $F_2$ are identical, the power in an output leg is $$P = \cos^2(3.1416 \cdot dL/\lambda) \tag{1}$$

where dL is the difference in optical path lengths between fibers $F^1$ and $F^2$. For a device where the path length difference is obtained using different core refractive indices, the output power would be $$P = \cos^2(3.1416 \cdot L \cdot dn/n \cdot \lambda) \tag{2}$$

The effect that different cores have on the optical path length can be estimated by assuming half the power of a single mode guide is in the core and by increasing the delta ($\Delta$) of a fiber. The effective index changes approximately as $$dn/n = (\Delta_{1-2} + \Delta_{1-2'})/2 \tag{3}$$

where $\Delta_{1-2}$ equals $(n_1 - n_2^2)/2n_1^2)$ and $\Delta_{1-2'}$ equals $(n_1'^2 - n_2^2)/(2n_1'^2)$, $n_1$ and $n_1'$ being the refractive indices of cores 16 and 17, respectively. The difference in path lengths between the two fibers of FIG. 1 would then be $$\begin{aligned} dn/n &= (\Delta_{1-2} + \Delta_{1-2'})/2 - 2 \cdot \Delta_{1-2}/2 \\ &= (\Delta_{1-2'} - \Delta_{1-2})/2 \end{aligned} \tag{4}$$

Equation 4 can be inserted into equation 2 to obtain $$P = \cos^2(3.1416 \cdot L \cdot (\Delta_{1-2'} - \Delta_{1-2})/\lambda) \tag{5}$$

Figure 6:
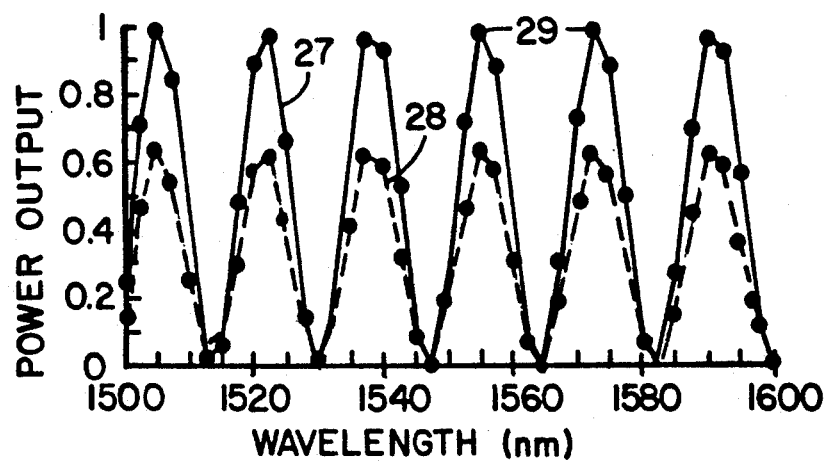
FIG. 6 is a plot of calculated output power v. wavelength for a single-stage Mach-Zehnder filter having a 2 cm long phase shift region.

Equation 5 is plotted in FIG. 6, for a single-stage Mach-Zehnder filter in which fiber 16 has a $\Delta_{1-2}$ value of 0.3% and fiber 17 has a $\Delta_{1-2}$ value of 1.0%, the optical path length L being 1 cm. The wavelength separation between the peaks 29 in FIG. 6 would be halved if L were doubled.

The length L of the phase shifting region 14 of FIG. 1 includes both the constant diameter portion and part of the adjacent tapers of couplers 11 and 12. Thus, length L extends between the two lines designated L. When initially fabricating the device of FIG. 1, the constant diameter section of region 14 is initially made slightly shorter than the value L calculated from equation 5. The resultant device is tested, and additional devices can then be made, the required value of L being determined empirically.

Figure 7:
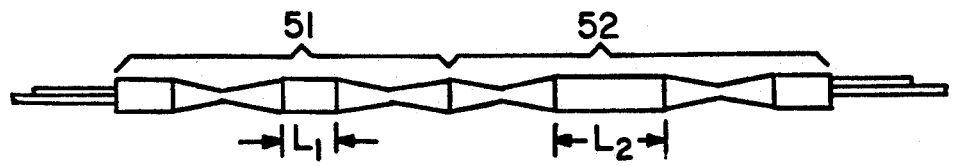
FIG. 7 is a schematic illustration of two concatenated Mach-Zehnder devices.
Figure 8:
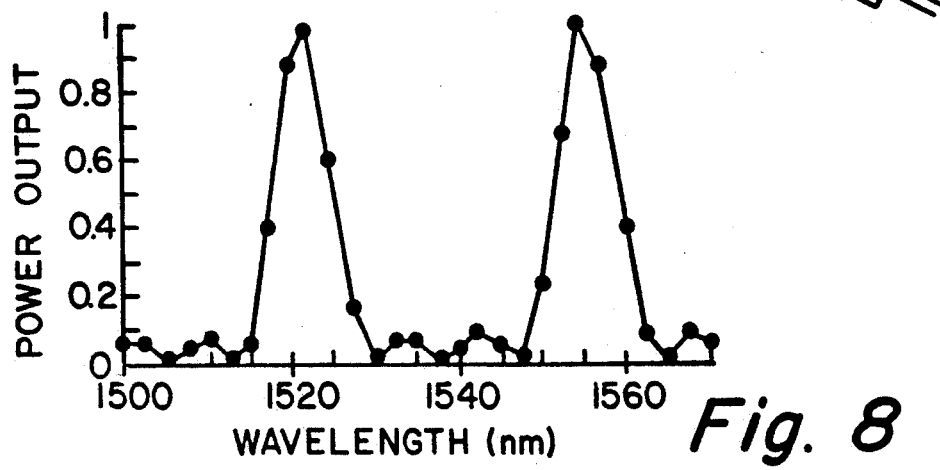
FIG. 8 is a plot of calculated output power v. wavelength for the Mach-Zehnder filter of FIG. 7.

Two Mach-Zehnder devices 51 and 52 can be concatenated as shown in FIG. 7. Only one of the fibers should extend from device 51 to device 52. When the delay of the phase shift region of one Mach-Zehnder device is twice the delay of the phase shift region of the other Mach-Zehnder device, e.g. if $L_1$ is 1 cm and $L_2$ is 2 cm, the spectra of FIG. 8 is obtained. This calculation is obtained by taking the product of two terms like equation. 5.

Two double stage Mach-Zehnder devices can be spliced together to provide higher isolation by narrowing the filter spectrum peaks and reducing noise. Good environmental performance can still be expected, since it is only the single stages themselves that need to be monolithic for good thermal stability. This is because the important phase shifting occurs in the region between the two 3 dB couplers of a single Mach-Zehnder device and not in the region between the two stages.

It is noted that the output power in FIGS. 6 and 8 varies from zero to essentially 100% of the input power. To obtain such filtering, the Mach-Zehnder device must employ 3 dB couplers which split the input signal into two equal parts. To obtain filtering wherein the output varies from x% to 100-x%, the couplers must unequally divide the input signal. Such couplers might split the input signal in a 20%–80% ratio, for example. Curve 28 of FIG. 6 illustrates the output of a Mach-Zehnder filter employing couplers other than 3 dB couplers.

If it is desired that the phase shift region be entirely resistant to bending, the entire Mach-Zehnder device can be wrapped or encapsulated in a stiff material such as a metal or polymer, for example, which is in intimate contact with the device. Such encapsulation is not suitable for fused biconic taper couplers that lack the overclad matrix glass 19. Since the mode fields of the coupler fibers extend beyond the fibers in the coupling region, a fused biconic taper coupler would become lossy if that energy extended into the encapsulation material.

Figure 9:
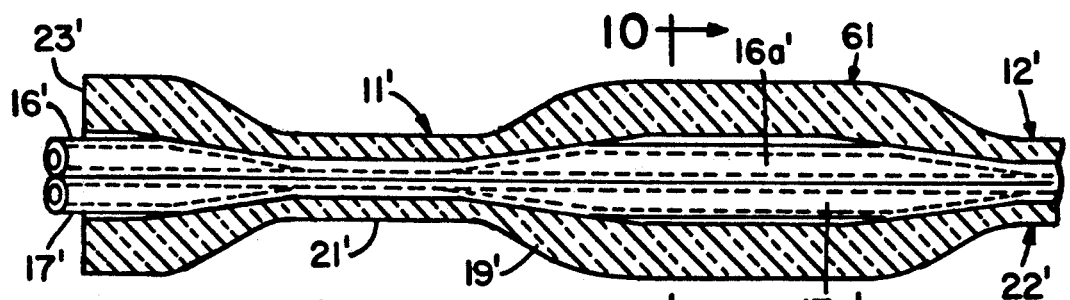
FIG. 9 is a cross-sectional view of a further embodiment.
Figure 10:
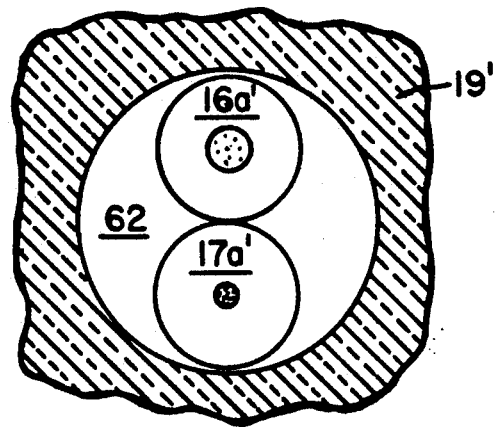
FIG. 10 is a partial cross-sectional view taken along lines 10—10 of FIG. 9.
Figure 12:
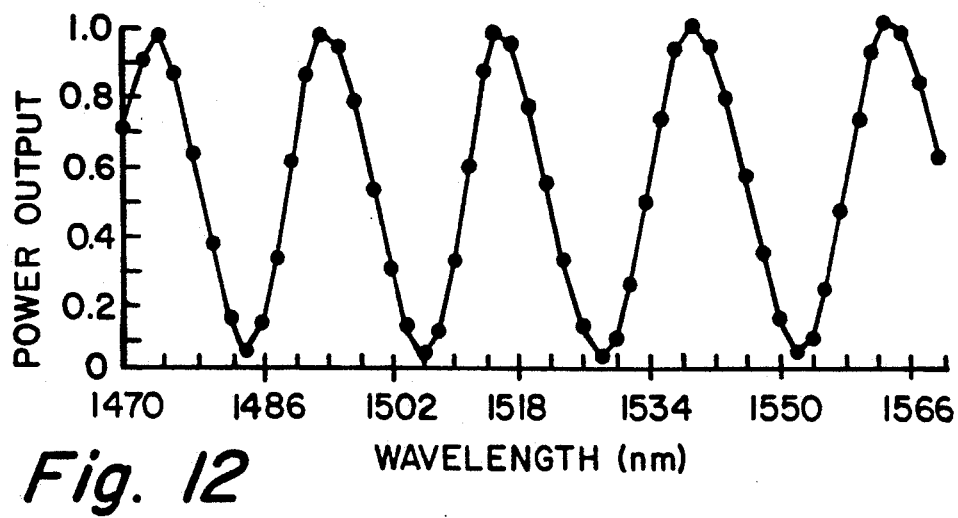
FIG. 12 is a plot of measured output power v. wavelength for a single-stage Mach-Zehnder filter of the specific example.

The phase shift section can also remain uncollapsed as shown in FIGS. 9 and 10 in which elements similar to those of FIG. 1 are represented by primed reference numerals. Except for the following changes, the device would be formed as described above. After the tube of matrix glass 19' is placed within the ring burner and secured at both ends by the computer controlled stretching chucks, it is evacuated by affixing the vacuum attachments to its ends. In this embodiment, the tube is initially heated near end 23' to cause it to collapse at the region of applied heat. Coupler 11' is formed by reheating the tube in the same location and moving the chucks in opposite directions to stretch the heated region and impart to coupler 11' the desired coupling characteristics. Relative movement between the tube and burner then positions the burner at the proper location near the opposite end of the tube where the collapse and stretch operations can again be performed to form coupler 12'. The fibers 16a' and 17a' extend through a cavity 62 in phase shift region 61.

Figure 11:
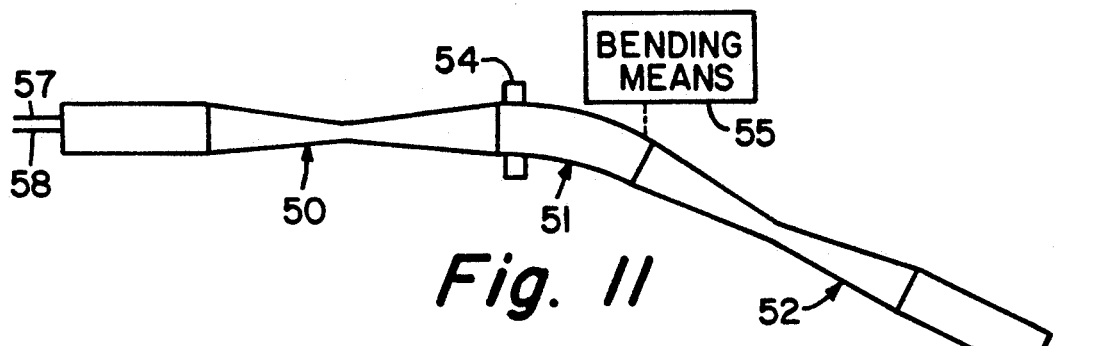
FIG. 11 is a schematic diagram that illustrates a tunable Mach-Zehnder device.

The embodiments of FIGS. 1 and 9 can be wavelength tuned or switched by bending phase shift region 14 or 61 in the plane of the fibers as shown in FIG. 11 wherein couplers 50 and 52 are connected by phase shift region 51. One end of region 51 can be held fixed by means 54, and the other end of region 51 can be deflected by means 55 to bend fibers 57 and 58 in the plane in which both fibers lie. Electromagnetic, piezoelectric, bimetallic and other types of devices can provide the small, controlled bending movement. The rotary action of the switch disclosed in U.S. Pat. No. 5,146,519 is also suited for bending fibers 57 and 58.

Mach-Zehnder devices other than filters also benefit from the disclosed monolithic construction. For example, the device of FIG. 11 could function as a switch, a signal at a given wavelength being switched from fiber 57 to fiber 58 by appropriately bending region 51.

The following specific example describes a method of making a Mach-Zehnder filter.

The optical fibers were made by a process similar to that disclosed in U.S. Pat. No. 4,486,212 (which is incorporated herein by reference). Briefly, in accordance with that patent, a porous core preform comprising a core region and a thin layer of cladding glass is formed on a cylindrical mandrel. The mandrel is removed, and the resultant tubular preform is gradually inserted into a consolidation furnace muffle, the maximum temperature of which is between 1200° and 1700° C. and preferably about 1490° C. for high silica content glass. The temperature profile of the muffle is highest in the central region as taught in U.S. Pat. No. 4,165,223, which is incorporated herein by reference. Chlorine, which is normally present in the minimum concentration that is required to achieve drying, may be supplied to the preform by flowing into the preform aperture a drying gas consisting of helium and about 5 volume percent chlorine. The end of the aperture can be plugged to cause the gas to flow through the preform pores. A helium flushing gas is simultaneously flowed through the muffle.

The resultant tubular glass article is stretched in a standard draw furnace while a vacuum is applied to the aperture to form a "core rod" in which the aperture has been closed. A suitable length of the rod is supported in a lathe where particles of silica are deposited thereon. The resultant final porous preform is gradually inserted into the consolidation furnace where it is consolidated while a mixture of 99.5 volume percent helium and 0.5 volume percent chlorine is flowed upwardly through the furnace. The resultant glass preform is drawn to form a step-index, single-mode optical fiber.

(a) Forming Fiber 16

Fiber 16 was a standard telecommunication optical fiber. A first layer of glass particles comprising $SiO_2$ doped with 8.5 wt. % $GeO_2$ was deposited on a mandrel, and a thin layer of $SiO_2$ particles was deposited on the first layer. The mandrel was removed, and the resultant porous preform was dried and consolidated. During this process, a gas mixture containing 65 sccm (standard cubic centimeter per minute) chlorine and 650 sccm helium flowed into the center hole where the mandrel had been removed. A flushing gas containing 40 slpm (standard liters per minute) helium and 0.5 slpm oxygen flowed upwardly from the bottom of the consolidation furnace muffle. The resultant consolidated preform was inserted into a draw furnace. The aperture was evacuated, and the lower end of the tubular body was heated to 1900° C. and drawn at a rate of about 15 cm/min to form a 5 mm solid glass rod. The rod was severed to form sections, one of which was supported in a lathe where it functioned as a mandrel upon which $SiO_2$ cladding soot was deposited to form a final porous preform. The final porous preform was gradually inserted into the alumina muffle of a furnace having a maximum temperature of 1490° C. where it was consolidated to form a draw blank. During the consolidation process, a gas mixture containing 40 slpm helium, 0.5 slpm chlorine and 0.5 lpm oxygen flowed through the muffle. The tip of the draw blank was heated to about 2100° C., and a fiber having an outside diameter of 125 $\mu$m was drawn therefrom, the fiber being coated with a 170 $\mu$m diameter urethane acrylate coating during drawing.

(b) Forming Fiber 17

Except for the following differences, a process similar to that described in section (a) was employed to form fiber 16. A first layer of glass particles comprising $SiO_2$ doped with 18 wt. % $GeO_2$ was deposited on a mandrel, and a thin layer of $SiO_2$ particles was deposited on the first layer. The resultant porous core preform was consolidated, stretched and overcoated with pure silica cladding. The ratio of the core diameter to the outside diameter of the resultant draw blank was such that the core was smaller than that of fiber 16 (see Table 1). The fiber was drawn to an outside diameter of 125 μm and was provided with 170 μm diameter urethane acrylate coating.

c. Fiber Characteristics

Table 1 lists $\Delta^{esi}$ (equivalent step index delta), $d^{esi}_c$ (equivalent step index core diameter), and the MFD of these fibers. The mode field parameters for fiber 16 are those nominal values that were previously measured for production fibers; they were determined using the variable aperture far-field method in accordance with the Petermann II definition of mode field diameter. The mode field parameters for fiber 17 are calculated.

TABLE 1

|  | $\Delta^{esi}$ | $d^{esi}_c$ |
| --- | --- | --- |
| Fiber 16 | 0.0036 | 8.3 μm |
| Fiber 17 | 0.008 | 3.5 μm | d. Forming the Coupler

The glass capillary tube that was employed had a 56.3 cm length and an outside diameter of 2.70 mm. The bore was diamond shaped, each side of the diamond having a length of about 310 μm. The capillary tube, which was formed by a flame hydrolysis process, was comprised of silica doped with 9 wt. % $B_2O_3$. Funnels were formed in each of the tube ends by flowing $NF_3$ through the tube while heating the end of the tube.

Coated optical fibers 16 and 17 were cut to lengths of about 3 meters. A section of coating about 48.3 cm long was removed from the central region of both fibers, and they were threaded through the tube bore until the uncoated portions were disposed intermediate the ends of the tube. A small amount of UV-curable adhesive was applied to the coated fibers to tack them to one end of the tube. The fibers were subjected to a slight tension and were tacked to the other end of the tube.

The resultant coupler preform 31 was inserted through ring burner 34 and clamped to draw chucks 32 and 33 of the apparatus of FIG. 3, the center of the burner being positioned approximately 1.9 cm from the top end of the capillary tube. Vacuum attachments 41 and 41' were secured to the ends of the tube and were clamped (arrows 44, 44') to apply to preform 31 a vacuum that was allowed to stabilize at approximately 38 cm (15 inches) of Hg.

Gas and oxygen were flowed to the ring burner at 60 slpm and 120 slpm, respectively. The ring burner was turned on for about 18 seconds to increase the temperature of a region of the tube from about 14 to 23 mm from the end. This caused tube to collapse onto the fibers along a section of the tube about 0.92 cm long. After the coupler preform cooled for about 30 seconds, the flame was reignited with the gas and oxygen flows being the same as for the tube collapse step, and the collapsed region was reheated for about 16 seconds. The vacuum remained at approximately 38 cm of Hg. Chucks 32 and 33 moved in opposite directions at a rate of about 2.5 cm/sec to provide a total increase in tube length of about 1.55 cm, whereby coupler 12 was formed.

The lower computer controlled chuck was loosened, and the upper chuck 32 was then moved downwardly for a distance of 2.835 mm to position the bottom end region of the tube within the burner. The above steps of collapsing the tube onto the fibers and stretching the tube were repeated to form coupler 11.

After the coupler had cooled, the vacuum lines were removed from the coupler, and a drop of adhesive was applied to each end of the capillary tube and was exposed to UV light. The Mach-Zehnder device was then removed from the draw.

The overall length of tube of the resultant Mach-Zehnder device was 8.75 cm, and the length of the constant diameter portion of the phase shift region between the two couplers was 1.144 cm. The spectral output of the device is shown in FIG. 11.

We claim:

1. A Mach-Zehnder device comprising
an elongated body of matrix glass,
first and second dissimilar optical fibers extending longitudinally through said body,
a phase shift region in said body in which said fibers have different propagation constants, and whereby optical signals propagate through said optical fibers at different velocities in said phase shift region,
two spaced coupler regions in said body at opposite ends of said phase shift region, the diameter of said body and the diameters of said fibers being smaller in said coupler regions than in said phase shift region.

2. A device in accordance with claim 1 wherein the cores of said fibers have different refractive indices.

3. A device in accordance with claim 1 wherein the cores of said fibers have different diameters.

4. A device in accordance with claim 1 wherein the cores of said fibers have different refractive indices and different diameters.

5. A device in accordance with claim 1 wherein said matrix glass substantially contacts said fibers in said phase shift region.

6. A device in accordance with claim 1 wherein said fibers extend through an elongated cavity in said phase shift region, whereby said matrix glass remains substantially uncontacted by said fibers in said phase shift region.

7. A device in accordance with claim 1 further comprising means for bending said phase shift region.

8. A device in accordance with claim 1 wherein said coupler regions are achromatic.

9. A device in accordance with claim 1 wherein said two coupler regions are substantially identical.

10. A device in accordance with claim 1 wherein said two coupler regions are not identical.

11. A device in accordance with claim 1 wherein said two coupler regions are both 3 dB couplers.

12. A device in accordance with claim 1 wherein said fibers are not fused together in said phase shift region.

13. A device in accordance with claim 1 wherein the diameters of said fibers in said phase shift region are the same as the diameters of said fibers at those ends of said couplers opposite said phase shift region.

14. A method of making a Mach-Zehnder device comprising
inserting a plurality of optical fibers into the bore of a glass tube,
evacuating said tube bore,
heating said tube to collapse a first region of said tube onto said fibers,
stretching the midregion of said first collapsed region to form a first coupling region,
heating said tube to collapse a second region of said tube onto said fibers, and stretching the midregion of said second collapsed region to form a second coupling region that is spaced from said first coupling region.

15. A method in accordance with claim 14 wherein the steps of heating said tube to collapse said first and said second tube regions are performed prior to the step of stretching the midregion of said first collapsed region.

16. A method in accordance with claim 14 wherein the steps of heating said tube to collapse said first and said second tube regions comprises subjecting said first tube region to a source of heat, and moving said source of heat toward said second collapsed region until the entire portion of said tube that includes said first and second collapsed regions and the region between said first and second collapsed regions are collapsed onto said fibers.

17. A method in accordance with claim 14 wherein the step of stretching said second coupling region is identical to the step of stretching said first coupling region.

18. A method in accordance with claim 14 wherein, after the steps of heating said tube to collapse said first and second regions of said tube onto said fibers, said matrix glass substantially contacts said fibers between said coupling regions.

19. A method in accordance with claim 14 wherein, after the steps of heating said tube to collapse said first and second regions of said tube onto said fibers, said matrix glass substantially is spaced from said fibers between said coupling regions.

* * * * *